May 31, 1960

J. DOLEMAN ET AL 2,938,276

SEAL FOR FLUIDIZED BED

Filed July 10, 1957

INVENTORS
Jack Doleman
AND
William Vivian Morgan
BY: Michael A. Striker
ATTORNEY May 31, 1960     J. DOLEMAN ET AL     2,938,276
SEAL FOR FLUIDIZED BED Filed July 10, 1957     3 Sheets-Sheet 2

INVENTORS
Jack Doleman
AND
William Vivian Morgan
BY Michael S. Striker
ATTORNEY

May 31, 1960   J. DOLEMAN ET AL   2,938,276
SEAL FOR FLUIDIZED BED
Filed July 10, 1957   3 Sheets-Sheet 3

INVENTORS
Jack Doleman
AND
William Vivian Morgan
BY: Michael A. Striker
ATTORNEY

United States Patent Office 2,938,276
Patented May 31, 1960

2,938,276

SEAL FOR FLUIDIZED BED

Jack Doleman, Cheadle, and William Vivian Morgan, Manchester, England, assignors to The British Rayon Research Association, Manchester, England, a British association Filed July 10, 1957, Ser. No. 670,957

Claims priority, application Great Britain Mar. 7, 1957

6 Claims. (Cl. 34—95)

This invention concerns the treatment of filaments, fibres, threads, films and sheet material in the unwoven or woven, knitted, or likewise fabricated form.

It is known (U.S. patent specification No. 2,785,478 for example) to treat filaments, fibres, threads, films and sheet material in the unwoven or woven, knitted or likewise fabricated form (hereinafter called "the material under treatment") in a bed of solid discrete particles, while subjecting the bed to an upward gaseous current, the size and weight of the particles and the velocity and nature of the current and the disposition of the material under treatment being so chosen that the forces exerted by the current on the particles are sufficient to counterbalance the gravitational force on free particles and to expand the bed thus allowing movement of the particles but is insufficient to convert the whole bed into a unidirectional stream of particles. The said movement of the particles in the bed may be random or include those analogous to convection or circulatory flow in a liquid, that is to say, localised upward movement of particles may occur in a zone or zones of the bed, for example in zones adjacent to the material under treatment, and localised downward movement of particles may occur in another zone or zones of the bed and these localised movements may vary in position and/or direction but the current must not be such as to substitute for these random or convectional or circulatory movements a unidirectional flow of the particles of the whole bed. A bed of solid discrete particles subjected to and expanded by such an upward gaseous current in the manner described is herein and in the claiming clauses hereof called "a fluidised bed."

It is necessary to provide sealing means to prevent loss of fluidised material in those applications of the fluidised bed to the treatment of materials wherein the material under treatment enters or leaves the fluidised bed otherwise than from the top of the bed. The present invention is concerned with such arrangements and has for its object the improvement of the sealing means and effect, and in particular to minimise tension in the material under treatment due thereto, where the said material enters or leaves through the base of the fluid bed.

According to the present invention a method of passing a filament, fibre, thread or sheet material in the unwoven or woven, knitted or likewise fabricated form into or out of a fluidised bed as herein defined is characterised by the step of passing the same through an aperture in the base of a fluidised bed container, and at the same time directing a gas upwardly through or past the upper end of the aperture at a sufficiently high velocity substantially to preclude leakage of particles from the inside of the container therethrough.

The upwardly directed gas may pass through the aperture itself or through jets or slits disposed immediately adjacent to and on each side of the aperture or the gas may pass upwardly as to part through the aperture and as to another part or parts through the said jets or slits. The jets or slits are shaped so as to direct the air above the aperture so that particles from the fluidised bed are prevented from falling downwardly through the aperture.

Preferably the gas is air and it may also be the fluidising gas. The particles are preferably solid glass particles, spherical or approximately spherical in shape (although shapes other than spherical are not excluded), for example, glass spheres of substantially uniform size and density and of diameter between 100 and 1,000 microns. By "substantially uniform" we mean within a diameter range of 300 microns. In practice we prefer the bed particles to have diameters of between 400 and 700 microns.

In a modification of this method, the region above the aperture or above the aperture and the aforesaid jets or slits has sides sloping downwardly towards the aperture and is filled with larger and denser particles (such as steel balls of from 4,000 to 5,000 microns diameter) which may remain unfluidised, or become partly fluidised. The said larger and denser particles increase the efficiency of the sealing means and effect.

When these larger and denser particles are employed to supplement the sealing effect, the bottom of the container for the fluidised bed is preferably sloped downwardly towards the aperture so that the said larger particles tend to gravitate towards the said aperture.

The size of the larger and denser particles may be so chosen that the interstices between them are not large enough to allow passage of the smaller bed particles therethrough and so out of the bed through the aperture or apertures in the base of the container when the bed is inactive—that is to say with the air supply switched off.

The purpose of partially fluidising the said larger and denser particles is different from that applying to the fluidised bed. The said larger and denser particles may be partly fluidised for the purpose of reducing or eliminating friction between this part of the sealing means and the material under treatment. By suitably reducing this friction it is possible to retain the larger and denser particles to supplement the sealing effect at the bottom of the container and permit the material under treatment to enter or leave from the bottom of the container. Partial fluidisation of these larger and denser particles is particularly useful in the case where the material leaves from the bottom of the container, or any tendency of these particles to pack in the region of the aperture and cause increased tension in the material is discouraged.

Means such as deflecting plates may also be provided above the said sealing means for diverting part of the gas flowing upwardly through the sealing means into different parts of the fluidised bed. For example, part of the air may be diverted away from the material under treatment and used to fluidise those parts of the bed remote from the material under treatment. Furthermore additional fluidising air supply means may be distributed across the base of the bed.

The invention also includes sealing apparatus for use according to such method, which comprises a seal for a container for a fluidised bed which includes an aperture in the base of the said container to allow material under treatment to pass through the said base, and means in the form of an air-box assembly adapted for supplying a gas from beneath the said container upwardly through or past the upper end of the aperture at a velocity sufficient to preclude leakage downwardly from the inside of the container through the aperture of ballotini or the like particles of between 100 and 1,000 microns diameter from the fluidised bed when the apparatus is in operation.

Preferably the base of the container has a longitudinal aperture beneath which is disposed the air-box assembly, comprising, at each side of the aperture, a chamber shaped so that when a gas under pressure is supplied thereto it will be directed upwardly through or alongside the aperture at each side region thereof, the chambers being spaced apart to allow passage of the material under treatment through the central part of the aperture.

Each chamber may be in two parts, shaped so as together to form a slit through which the gas may be blown, each slit lying parallel and adjacent one side of the aperture, the two slits being spaced apart to leave an aperture therebetween, through which the material may pass. It is desirable that the two parts of each chamber should be mutually adjustable whereby the slit widths may be varied. Furthermore the container, immediately above the air-box may be adapted to contain a mass of particles of a substantially larger size and heavier density than the bed particles in the unfluidised state.

The invention will now be described further, by way of example, with reference to the accompanying drawings, in which.

Figure 1:
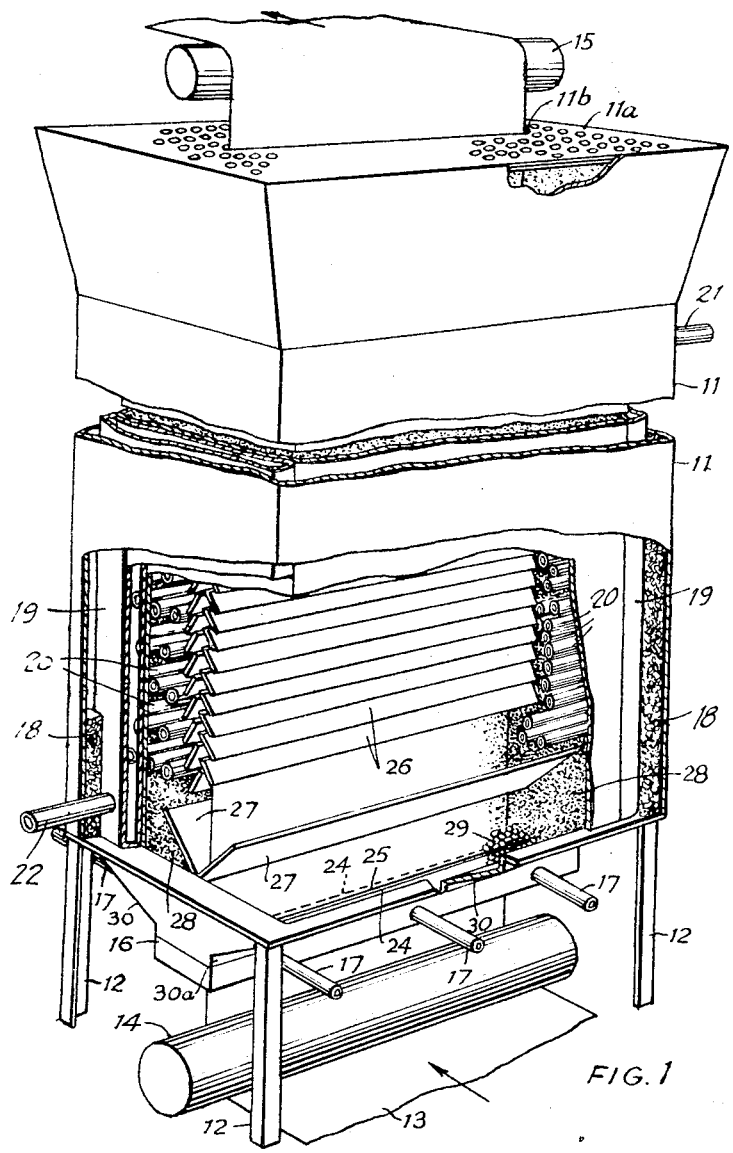
Fig. 1 is a perspective view, partly in section to show more clearly the internal construction, of a fluid bed machine.

Referring firstly to Fig. 1, a container 11 for the bed is supported in vertical position by a suitable frame-work 12. The length of the container is adequate to accommodate the widest fabric to be heated, the width is adequate to accommodate sufficient heating means, and the height is adequate to accommodate sufficient bed material to achieve the desired rate of treatment. Typical measurements might be about three feet six long by one foot wide by seven feet high. Suitable means may be provided for leading a travelling length of fabric 13 to a position beneath the container 11, to convey it away from the top thereof. This direction may be reversed as already herein mentioned. Such means have not been fully shown in the figures since their design is a matter of normal engineering practice, a bottom roller 14 and a top roller 15 only being shown.

The top and bottom of the container 11 are of special construction, the top being flared and the bottom being fitted with a seal. At the top end of the flared portion of the container 11, a perforated plate 11a, the aperture thereof being covered with fine gauge, is fitted horizontally to form an air-permeable top closure. This closure has a central and horizontal slit 11b to allow the fabric under treatment to pass from the container.

The main body of the container has lagging 18 around its sides and ends, the lagging at the ends lying between the wall of the container 11 and headers 19. The headers 19 are connected by hollow, externally finned tubes 20, which pass through the bed, in two groups one towards each side of the container. Both headers 19 are provided with a steam inlet pipe 21, and with a condensate outlet pipe 22, whereby steam may be passed through the tubes 20 to enable the latter to act as heating means for the bed.

The seal in accordance with the present invention is shown generally at 16 at the bottom of the container, the numeral 16 in Fig. 1 indicating the air supply box part of the seal which is more fully described hereinafter. Air supply pipes 17 feed compressed air into the box 16.

The box 16, as is more fully described hereinafter has three narrow longitudinal slits disposed centrally thereof, the two outer ones 24 of which constitute inlets for the fluidising air or other gas, and the central one 25 constituting means by which the fabric enters the bed.

Figure 2:
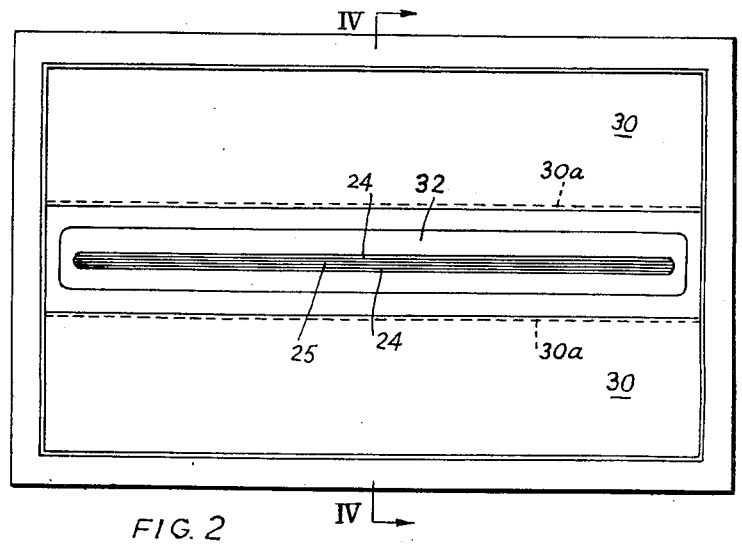
Fig. 2 is a plan view of the seal and air supply box of the machine shown in Fig. 1.
Figure 3:
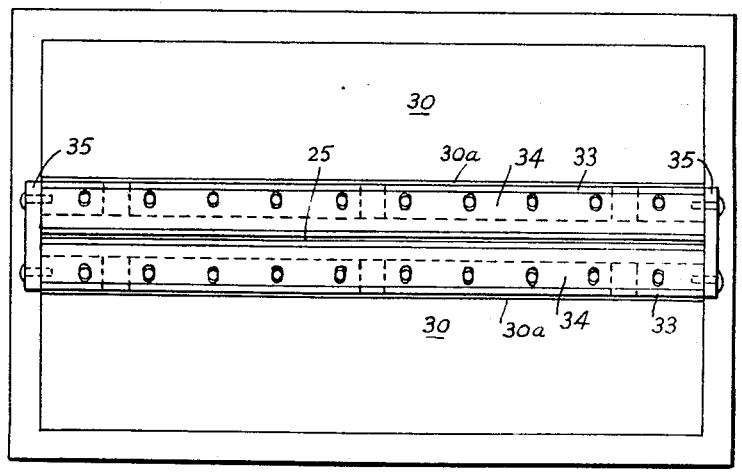
Fig. 3 is an inverted plan view corresponding to Fig. 2.
Figure 4:
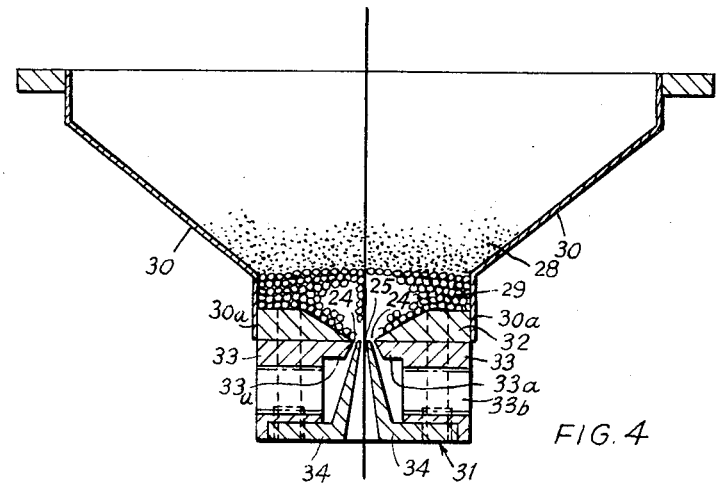
Fig. 4 is a section on the line IV—IV of Fig. 2 to an enlarged scale.

Referring now to Figs. 2, 3 and 4, which illustrate in more detail the seal and air-box construction it will be seen that this consists basically of a detachable, flanged closure 30 for the bottom of the machine, which is frusto-conical in end elevation, and a seal assembly 31. The latter is supported between two downwardly-directed portions 30a of the closure 30.

The seal and air-box assembly 31 comprises seven parts. These are a slotted plate 32, two air-box blocks 33, two slit-defining angle plates 34, and two end plates 35. The slotted plate 32 is secured between the lower ends of the portions 30a and is fixed in position by screws. It has a central longitudinal slot and the parts of the plate forming the edges of the slot are chamfered away to the upper surface of the plate. At each side of the slot to the underneath of the plate 32 are bolted the air-box blocks 33. These each have a longitudinal lip 33a extending to the region of the slot in the plate 32, have transverse passages 33b therethrough with which the air pipes 17 engage, and are rebated at their lower surfaces to accommodate the respective angles plates 34, the upwardly extending limbs of which extend to the region between lips 33a. The blocks 33 are transversely adjustable, the securing bolts passing through slots therein, to enable the proximity of the lips 33a to be varied. The angle plates 34 are similarly secured to the blocks 33 to form an air-chamber therewith, and to enable the proximity of the upper ends of their upwardly extending limbs to be varied. The assembly is completed by the end plates 35 which are bolted to the ends of the blocks 33.

It will be seen from Fig. 4 that the assembly 31 provides slits 24, 25 the widths of which can be varied, and an air chamber between blocks 33 and plates 34 via which air can be blown through slits 24.

Deflectors 27 may be provided above the seal as shown in Fig. 1 for diverting part of the fluidising gas to the outer regions of the bed. These deflectors may be made from similar metal to that of the louvre-like elements 26 (more particularly described in the specification of our co-pending application) but are much wider. The deflectors 27 are spaced apart at their lower ends by about quarter of an inch and at their upper ends by about two inches.

In use the material to be treated is first threaded through the container. The region above and around the slits in the box 16 is then supplied with steel balls 29 about 4,000 microns diameter.

The bed container is then filled with the bed particles 28. These are ballotini of 500 microns diameter, and the main part of the container is filled to about four-fifths of its depth. When the container 11 has been filled the fabric is threaded through the slit 11b in the perforated plate 11a and the latter secured in position.

The supply of fluidising air and the steam for heating are then switched on. The provision of the deflectors 27 serves to prevent an undue proportion of the air passing between the plates 26, and, hence, the satisfactory fluidising of the whole bed.

We have found that, with the width of the slits 24, 25 suitably adjusted and with the air pressure at a suitable value that the bed is effectively fluidised, that there is substantially no leakage of bed particles, and that the fabric passes easily into the container. The width of the slits and the air pressure may, for best results, vary in each case, but the width of the slits 24 will usually be between .005 inch and .050 inch, the width of the slit 25 will depend on the thickness and nature of the material being treated (for example with cotton material of eight ounces per square yard the width is .035 inch), and the air pressure between 7 and 15 pounds per square inch, all for a bed of the nature described about three feet in depth.

Although we have in the foregoing description referred exclusively to fabric we wish it to be understood that other materials may be treated equally successfully. As an example may be quoted a group of filaments.

Figure 5:
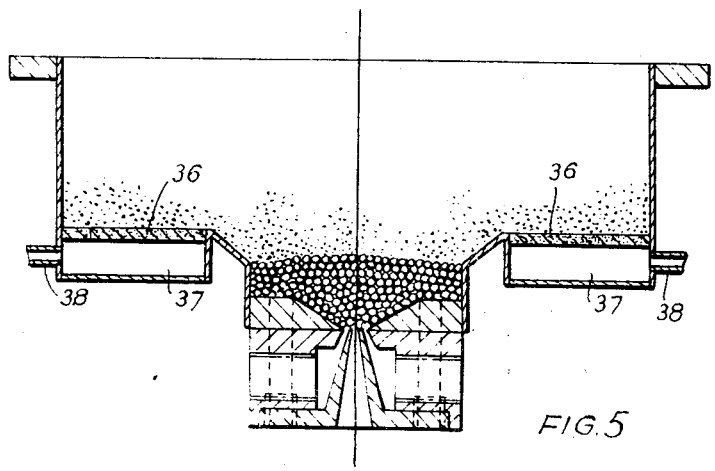
Fig. 5 is a sectional view similar to Fig. 4 showing means for the supply of additional fluidising air.

Furthermore we do not exclude the possibility of using additional air supply means distributed across the base of the bed. Such an arrangement is illustrated in Fig. 5, the shape of the container being modified at the base to accommodate, at each side, horizontal porous ceramic partitions 36, below each of which is a compartmented air-box 37 carrying air supply pipes 38 for each compartment.

What we claim is:

1. Sealing apparatus for a fluidised bed container, comprising, in combination, a container base formed with an aperture through which material under treatment passes; and means located adjacent said base for directing a gas upwardly at the region of the uppermost part of said aperture, at a velocity sufficient to prevent leakage downwardly from the inside of the container through said aperture of particles of the fluidised bed while the material is under treatment.

2. A device for preventing particles of a fluidised bed from falling below a predetermined elevation, comprising, in combination, a pair of elongated gas directing means located beside each other while being spaced slightly from each other, said pair of means being substantially coextensive and having upper elongated edges, respectively, located closely adjacent to each other and defining between themselves a passage for material to be treated, each of said means having a hollow interior and being formed with an elongated slit closely adjacent to its upper elongated edge and communicating with said hollow interior, so that gas under pressure supplied to said hollow interiors will be directed upwardly through said slits to prevent bed particles over said passage from falling downwardly therethrough.

3. A device as recited in claim 2 and wherein each of said gas directing means has a wall adjustable with respect to the remainder thereof and having an upper edge which forms said upper elongated edge of each gas directing means, whereby the adjustment of said walls regulates the width of said passage as well as the widths of said slits.

4. A device as recited in claim 2 and wherein a fluidised bed container has a bottom wall to the underside of which said pair of gas directing means are attached, said bottom wall being formed with an elongated aperture with which said passage and slits communicate.

5. A device as recited in claim 4 and wherein said aperture extends in the same direction as said passage and slits and has a width slightly greater than the total width of said passage and slits.

6. A device as recited in claim 5 and wherein said bottom wall has oppositely inclined upwardly directed elongated surface portions respectively located at the sides of said aperture and sloping upwardly therefrom.

References Cited in the file of this patent

UNITED STATES PATENTS 2,785,478     Audas et al.  ----------- Mar. 19, 1957